T. L. FYFFE.
PIPE JOINT AND THE LIKE.
APPLICATION FILED SEPT. 28, 1920.
1,379,811.
Patented May 31, 1921.
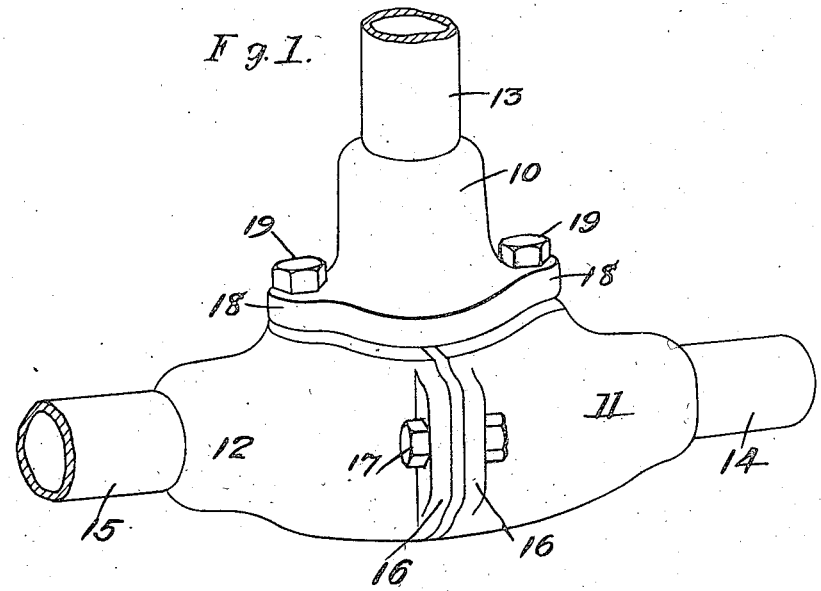
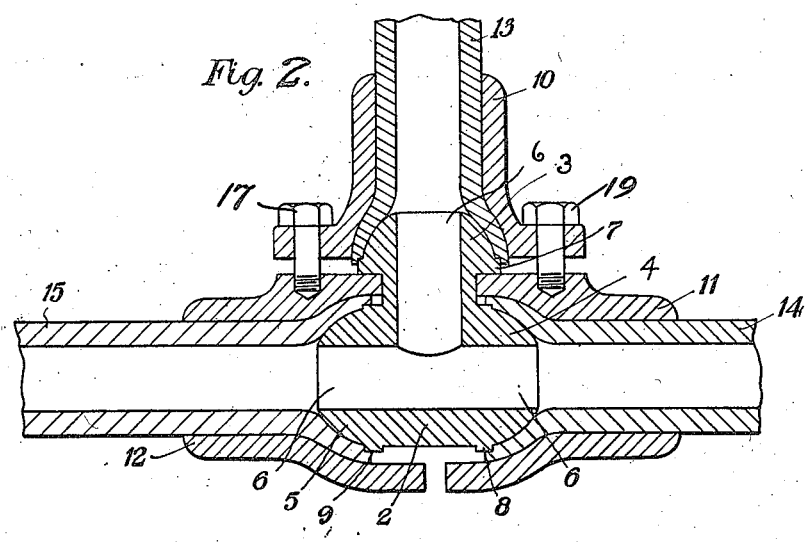
INVENTOR
Thomas Lillie Fyffe
By Wm Wallace White
ATTY.

UNITED STATES PATENT OFFICE.

THOMAS LILLIE FYFFE, OF DUNDEE, SCOTLAND.

PIPE-JOINT AND THE LIKE.

1,379,811.   Specification of Letters Patent.   Patented May 31, 1921.

Application filed September 28, 1920. Serial No. 413,297.

*To all whom it may concern:*

Be it known that I, THOMAS LILLIE FYFFE, a subject of the King of Great Britain and Ireland, residing at Dundee, in the county of Forfar, Scotland, have invented new and useful Improvements in or Relating to Pipe-Joints and the like, of which the following is a specification.

This invention relates to couplings for pipes and tubes of the type in which a coupling piece tapered at both ends is disposed inside the pipe at the joint and two correspondingly tapered collars are disposed outside the pipe ends with a union nut adapted to draw the tapered collars together.

The object of this invention is to provide improved means for jointing pipes and particularly for jointing lead or other metal pipes without the use of solder.

A pipe joint made in accordance with this invention is characterized in that those portions of the interior coupling piece which are to be in contact with the ends of the pipes to be joined are of spherical or approximately spherical shape, and in that the exterior collars are formed with correspondingly shaped ends. I prefer also to form the said interior coupling piece with one or more ridges or stops against which the ends of the pipes may abut when the joint is assembled.

Referring to the drawings filed herewith:—

Figure 1 is a perspective view of a T joint made in accordance with this invention.

Fig. 2 is a section of the joint shown in Fig. 1.

In the form shown herein, the coupling comprises a core 2 having semi-spherical ends 3, 4 and 5, each having a band 7, 8 and 9 respectively, encircling it, said ends being drilled as shown at 6 to form a three-way passage. Collars 10, 11 and 12, each having a flared end adapted to encircle one of said semi-spherical ends, are provided, the openings in the flared ends of the collars being of sufficient large diameter to accommodate the wall of a pipe, such as 13, 14 and 15, between said flared ends and the coöperating semi-spherical ends of the core, each of the collars also having a cylindrical portion encircling its pipe. Any suitable means may be provided for securing the collars together, but in the present instance the collars 11 and 12 are each provided with laterally extending perforated ears or lugs 16 at opposite sides thereof, the abutting ears of the collars being secured together by a bolt and nut 17. The collars 11 and 12 are each also provided at one side thereof with a flattened portion having a threaded perforation, and the collar 10 is flanged at its outer end, the flange being provided with a pair of perforated ears 18, through which pass screws 19 for engagement with the threaded openings in the collars 11 and 12, thereby to draw the flange of the collar 10 toward the flattened portions of the collars 11 and 12.

In use the collars are passed over the ends of the pipes, and the ends of the pipes are then swelled into the semi-spherical recess formed by the flared ends of the collars, by means of a suitable tool, the ends of the pipe being finished off. The interior core is then placed in position and the collars are secured together. The whole forms a simple, secure, and watertight joint, not requiring skilled labor to fit.

What I claim and desire to secure by Letters Patent is:—

A pipe coupling device, comprising a tubular three-way member having semi-spherical ends, an annular band encircling each of said ends, a tubular collar for each of said ends, each of said collars having a flared end adapted to encircle one of said semispherical ends and spaced therefrom a distance sufficient to accommodate the wall of a pipe between said semispherical end and said collar, each of said collars having a cylindrical portion adapted to encircle its pipe, and means for securing said collars together.

In testimony whereof I have signed my name to this specification.

THOMAS LILLIE FYFFE.